US009021590B2

(12) United States Patent
Herley et al.

(10) Patent No.: US 9,021,590 B2
(45) Date of Patent: Apr. 28, 2015

(54) SPYWARE DETECTION MECHANISM

(75) Inventors: Cormac E. Herley, Bellevue, WA (US); Brian W. Keogh, Bellevue, WA (US); Aaron Michael Hulett, Redmond, WA (US); Adrian M. Marinescu, Sammamish, WA (US); Jeffrey S. Williams, Seattle, WA (US); Stanislav Nurilov, Ft. Monmouth, NJ (US)

(73) Assignee: Microsoft Technology Licensing, LLC, Redmond, WA (US)

(*) Notice: Subject to any disclaimer, the term of this patent is extended or adjusted under 35 U.S.C. 154(b) by 2035 days.

(21) Appl. No.: 11/680,136

(22) Filed: Feb. 28, 2007

(65) Prior Publication Data

US 2008/0209557 A1 Aug. 28, 2008

(51) Int. Cl.
*G06F 21/00* (2013.01)
*G06F 21/56* (2013.01)

(52) U.S. Cl.
CPC ............ *G06F 21/565* (2013.01); *G06F 21/564* (2013.01); *G06F 21/568* (2013.01)

(58) Field of Classification Search
CPC ... G06F 21/568; G06F 21/565; G06F 21/564; G06F 21/53; H04L 63/145
USPC .................. 726/22, 24, 26, 38; 713/164, 188
See application file for complete search history.

(56) References Cited

U.S. PATENT DOCUMENTS

| | | | | |
|---|---|---|---|---|
| 5,936,622 A * | 8/1999 | Halverson et al. | ............ | 715/771 |
| 6,061,722 A * | 5/2000 | Lipa et al. | ..................... | 709/224 |
| 6,886,099 B1 * | 4/2005 | Smithson et al. | ............... | 726/24 |
| 7,010,698 B2 * | 3/2006 | Sheymov | ....................... | 713/194 |
| 7,243,373 B2 * | 7/2007 | Muttik et al. | ................... | 726/24 |
| 7,340,777 B1 * | 3/2008 | Szor | ................................. | 726/26 |
| 7,383,569 B1 * | 6/2008 | Elgressy et al. | .................. | 726/2 |
| 7,512,977 B2 * | 3/2009 | Cook et al. | ....................... | 726/22 |
| 7,627,758 B1 * | 12/2009 | Tock et al. | .................... | 713/168 |
| 7,802,301 B1 * | 9/2010 | Dreyer et al. | ................... | 726/24 |
| 8,402,012 B1 * | 3/2013 | Herz et al. | ..................... | 707/708 |
| 2002/0133590 A1 * | 9/2002 | McBrearty et al. | ........... | 709/225 |
| 2003/0046577 A1 * | 3/2003 | Silverman | ..................... | 713/200 |

(Continued)

FOREIGN PATENT DOCUMENTS

EP 1605332 A2 12/2005

OTHER PUBLICATIONS

Kumar, Sandeep, and Eugene H. Spafford. "A generic virus scanner for C++." Computer Security Applications Conference, 1992. Proceedings., Eighth Annual. (pp. 210-219). IEEE, 1992.*

(Continued)

*Primary Examiner* — Bradley Holder
*Assistant Examiner* — Kari Schmidt
(74) *Attorney, Agent, or Firm* — Julie Kane Akhter; Danielle Johnston-Holmes; Micky Minhas

(57) ABSTRACT

A system and method that facilitates and effectuates detection of malware secreted and/or hidden in plain sight on a machine. The system and method in order to achieve its aims generates a list of all loaded modules, identifies from the list a set of modules common to more than a threshold number of processes, and eliminates from the list those modules included in an authentication list. The resultant list is prioritized based, in one instance, on the number of occurrences a particular module makes in the resultant list, and thereafter the list is distributed analyst workstations.

18 Claims, 10 Drawing Sheets

(56) References Cited

U.S. PATENT DOCUMENTS

| | | | |
|---|---|---|---|
| 2003/0065926 A1* | 4/2003 | Schultz et al. | 713/188 |
| 2005/0021994 A1* | 1/2005 | Barton et al. | 713/200 |
| 2005/0204205 A1* | 9/2005 | Ring et al. | 714/47 |
| 2005/0268112 A1 | 12/2005 | Wang et al. | |
| 2006/0031673 A1 | 2/2006 | Beck et al. | |
| 2006/0074896 A1* | 4/2006 | Thomas et al. | 707/4 |
| 2006/0075499 A1 | 4/2006 | Edwards et al. | |
| 2006/0156397 A1 | 7/2006 | Dai | |
| 2006/0161987 A1 | 7/2006 | Levy-Yurista | |
| 2006/0174028 A1* | 8/2006 | Zhu | 709/232 |
| 2006/0224927 A1 | 10/2006 | Wang et al. | |
| 2006/0242707 A1 | 10/2006 | Tang et al. | |
| 2007/0192855 A1* | 8/2007 | Hulten et al. | 726/22 |
| 2007/0234424 A1* | 10/2007 | Bu et al. | 726/22 |
| 2007/0244877 A1* | 10/2007 | Kempka | 707/5 |
| 2008/0016339 A1* | 1/2008 | Shukla | 713/164 |
| 2008/0133540 A1* | 6/2008 | Hubbard et al. | 707/10 |
| 2009/0077664 A1* | 3/2009 | Hsu et al. | 726/24 |

OTHER PUBLICATIONS

Yin, Heng, et al. "Panorama: capturing system-wide information flow for malware detection and analysis." Proceedings of the 14th ACM conference on Computer and communications security. (pp. 116-127). ACM, 2007.*

Stolfo, et al. "Towards Stealthy Malware Detection 1" Department of Computer Science, Columbia University, 20 pages.

Wang, et al. "Detecting Stealth Software with Strider GhostBuster" (2005) Proceedings of the International Conference on Dependable Systems & Networks, 10 pages.

Lavasoft. "Ad-Aware SE Plus Edition—Including 1 Year Maintenance" http://esd.element5.com/product.html?productid=511863&languageid=1&affiliated=71440 last viewed Dec. 13, 2006, 4 pages.

International Search Report and Written Opinion for PCT Application Serial No. PCT/US2008/053508, mailed Jul. 28, 2008, 11 pages.

Taiwanese Office Action mailed Nov. 19, 2013 for Taiwan patent application No. 97105062, a counterpart foreign application of U.S. Appl. No. 11/680,136, 12 pages.

* cited by examiner

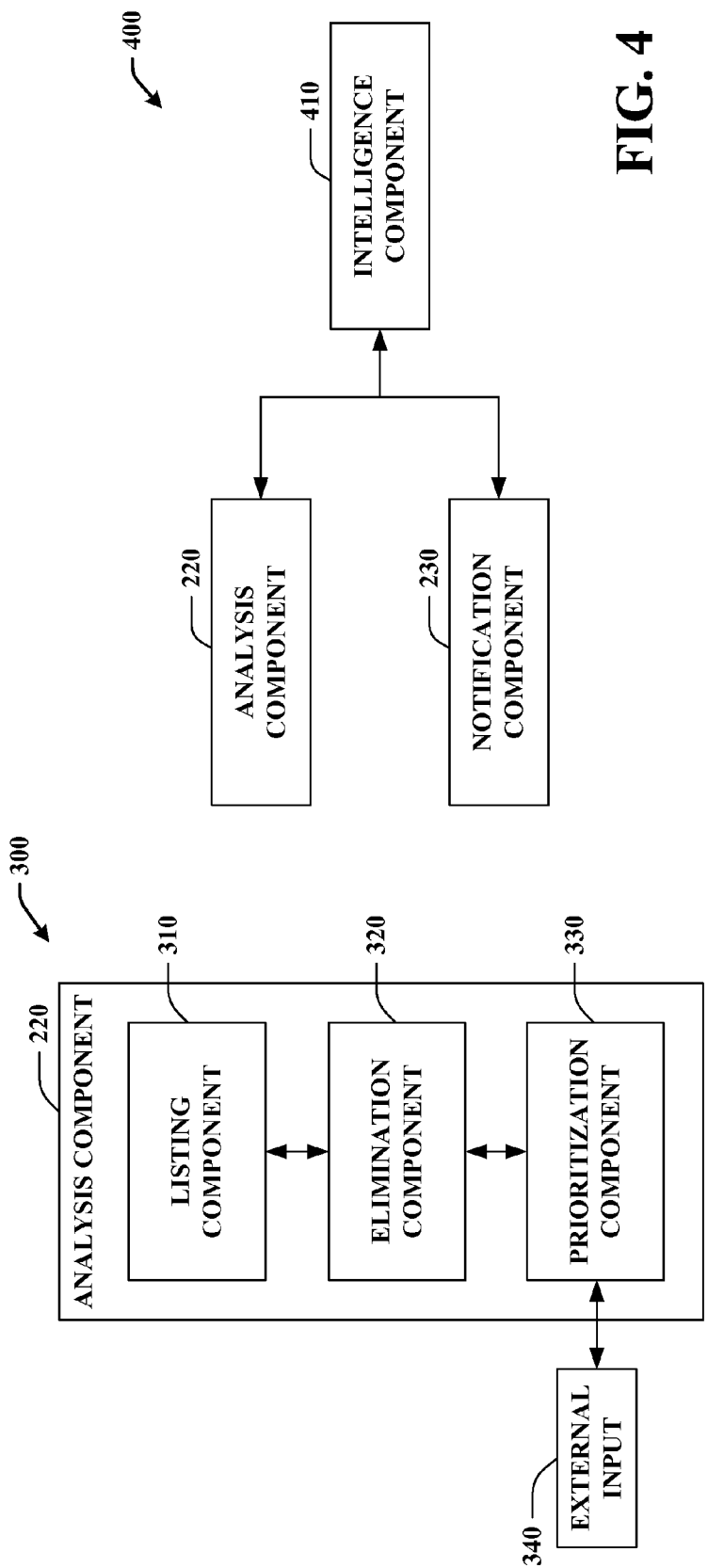

SPYWARE DETECTION MECHANISM

BACKGROUND

It has become increasingly common for programs known as spyware to eavesdrop on and/or monitor an individual's activity, and report back such activity to the entity that initiated and/or instantiated the spyware. Typically, spyware is computer software that collects personal information (e.g., passwords, Personal Identification Numbers (PINs), Social Security information, bank account, credit card and other ancillary financial details, etc.) about individuals without their consent. In one sense, spyware is software that monitors user behavior, or gathers information about the user that can include personally identifiable or other sensitive information, through an executable program, deployed without adequate notice, consent, or control for the user. Alternatively, spyware can be thought of as potentially unwanted technologies deployed without appropriate user consent and/or implemented in ways that impair user control over, for example, material changes that affect their experience, privacy, or system security; use of their system resources, including programs installed on their computers; and/or collection, use, and distribution of their personal or other sensitive information.

Additionally, adware, programs that cause advertising content to be delivered and displayed potentially in a manner or context that can be unexpected or unwanted by users, has also become a prevalent feature of the modern computing experience. Many adware applications, in addition to causing advertising content to unexpected be displayed, can also include tracking functionalities similar to those common in spyware.

SUMMARY

The following presents a simplified summary in order to provide a basic understanding of some aspects of the disclosed subject matter. This summary is not an extensive overview, and it is not intended to identify key/critical elements or to delineate the scope thereof. Its sole purpose is to present some concepts in a simplified form as a prelude to the more detailed description that is presented later.

The claimed subject matter in one aspect relates to a machine implemented system that detects malware secreted and/or hidden in plain sight on the machine. The system includes a detection component that can generate lists of all the modules loaded on the machine and thereafter can identify from the generated list a sub-set of modules common to more than a threshold number of processes. The system having identified the sub-set of modules extant in more than a threshold number of processes can utilize this subset to further thin the list by eliminating modules that are included in authentication lists supplied either by application software developers and/or by verified third-party software authenticators. The filtered list can then be prioritized based, for example, on a number of occurrences a particular module makes in the list, and thereafter the filtered and prioritized list can be forwarded to an analyst for further attention and investigation.

In a further aspect the claimed subject matter can measure whether any version of DLL injection is being used on a machine by measuring, for example, the intersection on non-white listed DLLs across all processes, across all processes that have accepted a certain event, such as a keystroke, and by measuring whether any module ends up injected into a honey pot (e.g. a process implemented to look more vulnerable than it truly is, and to keep records of everything that happens to it) version of a common process. Additionally, the claimed subject matter can measure whether any non-whitelisted process consistently consumes resources between successive events, such as, for example, repeated keystrokes. Response to these measurements can be used together with other measurements as input to a prioritization component that decides which of a larger number of suspected malware samples is most in need of an analysts attention.

In yet a further aspect of the subject matter as claimed, measurements can be made on the PCs of many diverse users who happen to have suspected malware installed on their machines, wherein the measurements can be reported to a prioritization component that aggregates the information before prioritizing for dissemination to analysts.

In another aspect of the claimed subject matter, suspected malware can be placed in a controlled environment (e.g., an emulator, a virtual machine, etc.) for study, measurements obtained from various tests carried out on the suspected malware samples, and results passed to a prioritization component that can convey prioritized lists of suspected malware to an analysts workstation for further examination.

To the accomplishment of the foregoing and related ends, certain illustrative aspects of the disclosed and claimed subject matter are described herein in connection with the following description and the annexed drawings. These aspects are indicative, however, of but a few of the various ways in which the principles disclosed herein can be employed and is intended to include all such aspects and their equivalents. Other advantages and novel features will become apparent from the following detailed description when considered in conjunction with the drawings.

BRIEF DESCRIPTION OF THE DRAWINGS

FIG. 3 provides a more detailed illustration of analysis component in accordance with the disclosed subject matter.

FIG. 4 illustrates a system that employs intelligence to facilitate detection of malware in accordance with aspect of the disclosed subject matter.

DETAILED DESCRIPTION

Figure 1:
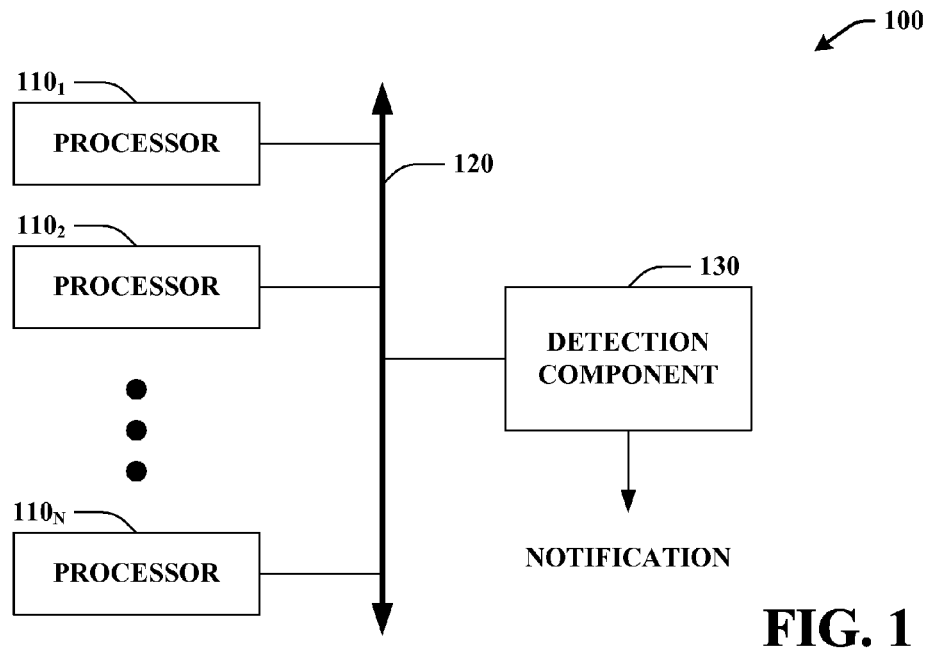
FIG. 1 illustrates a malware detection system in accordance with the claimed subject matter.

The subject matter as claimed is now described with reference to the drawings, wherein like reference numerals are used to refer to like elements throughout. In the following description, for purposes of explanation, numerous specific details are set forth in order to provide a thorough understanding thereof. It may be evident, however, that the claimed subject matter can be practiced without these specific details. In other instances, well-known structures and devices are shown in block diagram form in order to facilitate a description thereof.

The claimed subject matter, for the purposes of clarity, simplicity of explication, and comprehension, is elucidated in terms of key-logging and/or event-logging. Nevertheless, the subject matter as claimed is not so limited, and can find application in a plethora of other malware detection mechanisms and applications. Accordingly, any and all such applicability and derivations thereof are deemed to fall within the purview of the claimed subject matter.

Malware (e.g., spyware, adware, crimeware, fraudware, viruses, worms, and the like) generally attempts to conceal itself. Typically, malware authors go to great lengths to conceal the presence of their creations and more particularly the fact that such code is executing. Nevertheless, depending on the level of sophistication of the user there are various attributes that can reveal the fact that malware is resident and active on a machine. For example, a user can instantiate a system utility (e.g., Task Manager, Process Manager, Session Manager, etc.) to investigate active processes, threads, applications, and programs. Such investigation can reveal processes that the user does not recognize and as such provide indication that these processes might be malware.

As stated above, many, if not all, malware authors go to considerable lengths to ensure that their version of malware is concealed and is virtually undetectable by the uninitiated. For example, malware typically does not openly execute as "eventlogger.exe", "malware.exe", "spyware.exe", "adware.exe", and/or "crimeware.exe" per se. Thus, unless the malware author is careless, it is highly improbable that casual perusal of the system utility will expose the existence of operative malware.

One technique typically employed by authors of malicious processes and/or software to avoid detection and/or to conceal malware activity on a machine is a technique known as Dynamic Link Library (DLL) injection wherein a process or thread is inserted and executes in the memory space of a legitimate process. For example, a malicious process called "keylogger.exe" can launch a thread, but instead of the thread being associated with "keylogger.exe", the thread masquerades as belonging to legitimate process "legitimate.exe". Malicious process "keylogger.exe" once it has accomplished its goal of launching its thread can vanish, but the thread initiated by "keylogger.exe" remains active but hidden since it is inside another, potentially legitimate, process—effectively spying on the user's activities with regard to other legitimately running processes and applications. Thus, when a system utility is consulted all that can be seen to be executing are those processes that one would expect to be active. Nevertheless, legitimate process "legitimate.exe" now has an extraneous parasitic thread associated with it that the user has little or no ability to detect. For example, legitimate process "legitimate.exe" may typically execute with between 20 and 30 threads and it is unlikely that an average user would be able to detect that an additional thread is present.

There are a number of methods of accomplishing DLL injection, the principle one being to attach to every process that loads certain modules. Typically, when processes commence execution they can load a plethora of disparate DLLs. Many of the DLLs that are loaded are system and user interface (e.g. Graphical User Interface) files, such as kernel32, user32, and the like. Authors of malicious processes and/or software can utilize this fact to associate malicious processes and/or software with these commonly loaded DLLs so that whenever a process calls one of these commonly loaded DLLs an instance of the parasitic process is loaded as well. Thus, when a legitimate process of its own accord loads a commonly loaded DLL, it unwittingly causes the malicious process (or repeated instances of the malicious process) to be introduced into the system unbidden and unasked.

Another technique for accomplishing DLL injection is for the malicious process to attach on particular common events (e.g., keystrokes, mouse clicks, right-mouse clicks, left-mouse clicks, etc.). For example, when a legitimate process accepts a keystroke, then the process that has a window open that accepted the keystroke will have associated thereto an instance of the malicious process DLL. There are mechanisms that malicious processes have for inserting a DLL into an executing process, when the insertion takes place or depending on how the author of malicious processes and/or software implemented the point of insertion, the malicious process can be started upon specific events occurring. As persons of reasonable skill in the art will readily recognize there are a multiplicity of event handlers (e.g. listening for particular external events, user action and/or user inaction, etc.) associated with a typical operating system environment. Consequently, when a particular event occurs (e.g., when a key is pressed, when combination of keys is depressed, a mouse is moved, a mouse button clicked, a mouse button double clicked, etc.) code is executed every time that event occurs.

A further method for accomplishing malicious process insertion targets specific processes wherein the author of malicious software and/or processes creates a thread executing in a particular legitimate process. This is a very targeted and selective approach in that the malicious process thread typically only runs in the specific process to which it is directed. The benefit to the author of malicious software and/or processes is that the malicious process code has a much lower footprint; better to avoid detection and achieve stealth. Thus, in this scenario the author generally targets a process and/or application that is typically beyond reproach and that have a fairly high probability of being executed on a continuous and/or periodic basis. Having identified such an application and/or process, the author inserts a single thread into the identified application and/or process.

FIG. 1 illustrates a malware detection system 100 that continuously, dynamically and automatically oversees, individually and/or collectively, a first processor $110_1$, a second processor $110_2$, through to an Nth processor $110_N$, N being an integer greater than or equal to one. The first processor $110_1$, the second processor $110_2$, through to the Nth processor $110_N$ can be referred to collectively as processors 110. Processors 110 can be in operative and continuous communication with detection component 130 via communication medium 120. Processors 110 can include any industrial, commercial, and/or consumer machinery with embedded, affiliated, associated and/or encapsulated processors, such as industrial automation devices, computing devices (e.g., laptops, note book computers, Personal Digital Assistants (PDAs), . . . ), cell phones, telephony equipment and/or devices, household and/or commercial appliances, etc. Processors 110 can include those of users who run a particular piece of software or participate in a particular network. Additionally, processors 110 can have associated storage, memory, etc. Further, communication medium 120 can include Ethernet, Wireless Ethernet, Wi-Fi, satellite based technologies, and the like.

Detection component 130 continuously monitors processors 110 to detect the existence of malicious processes (e.g., spyware, adware, crimeware, fraudware, viruses, etc.). Detection component 130 can upon detecting evidence of malicious processes can analyze the instance that raised the alarm to determine with certitude whether the instance constitutes malware, and if so can direct a notification to an analyst who investigates the issue further. Additionally and/or alternatively, detection component 130 can aggregate and/or classify the instances of detected malware and provide a prioritized report (e.g., flagging and ordering those items of detected malware which pose the greatest risk to the smooth running of the machine) to the analyst for further investigation and/or remedial measures. Moreover, detection component 130 can also, if necessary, generate and create remedial signature files for dissemination to processors 110 in order to curtail the continued operation of malware on processors 110.

Figure 2:
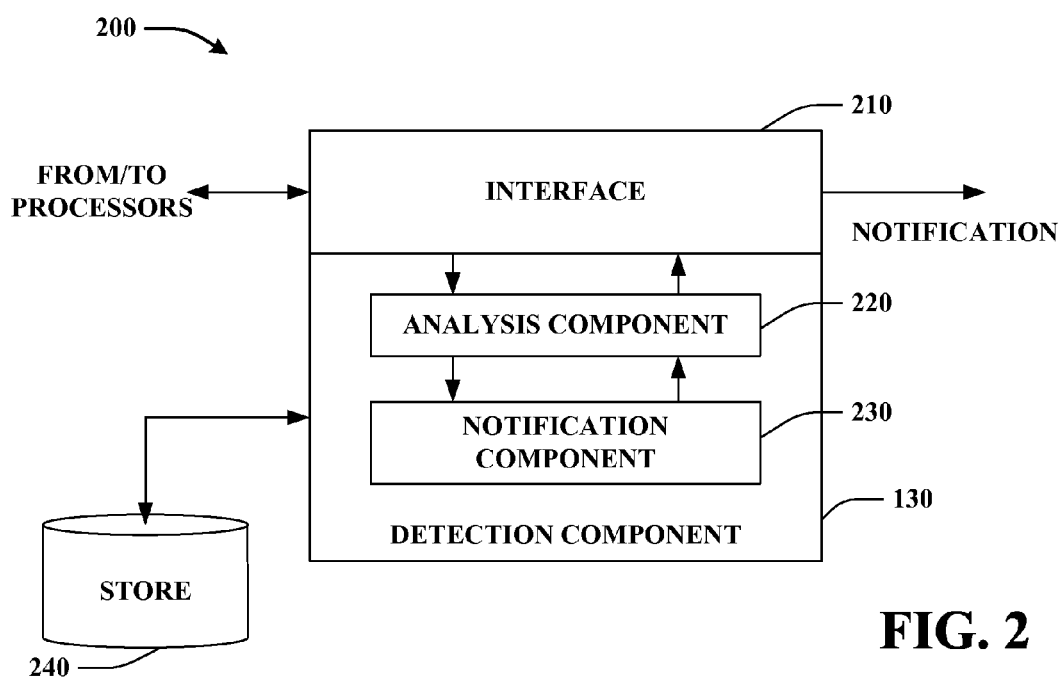
FIG. 2 provides a more detailed depiction of a detection component in accordance with one aspect of the claimed subject matter.

FIG. 2 provides a more detailed depiction 200 of detection component 130. As illustrated, detection component 130 can include interface 210 that receives data related to processes, applications, threads and DLLs loaded and executed by processors 110. Interface 210 can further disseminate notifications, by way of, for example, prioritized reports, color coded lists, etc., to analyst workstations for further investigation by human intermediaries. Alternatively and/or additionally, interface 210 can trigger one or more automated responses and/or code execution. For example, if particular malicious processes have been detected in the past, interface component 210 can issue a set of commands and/or present a dialog box on further detection of the same or a similar malicious process.

On receipt of data related to processes, applications, threads and DLLs loaded and executed by processors 110, interface 210 conveys such data to analysis component 220 that peruses all loaded modules executing in memory space associated with processors 110 and identifies modules that may warrant further attention. Once analysis component 220 has located modules that might warrant further attention, analysis component 220 can persist copies of code associated with identified modules in store 240. Alternatively and/or additionally, analysis component 220 can communicate information associated with the identification to notification component 230. Notification component 230 on receipt of the information from analysis component 220 can automatically and immediately generate a report (e.g. notification) that can be immediately forward to analysts workstations for further analysis by human intermediaries. Alternatively and/or additionally, notification component 230 can generate the report on periodic basis (e.g., once a month, once a week, once a day, twice a day, every four hours, etc.) wherein it is to be understood in this aspect that notification component 230 retrieves information previously and/or contemporaneously persisted by analysis component 220 in store 240 and thereafter generates the necessary notifying report.

FIG. 3 provides a more detailed illustration 300 of analysis component 220 in accordance with an aspect of the claimed subject matter. Analysis component 220 can include listing component 310, elimination component 320 and prioritization component 330. Listing component 310 obtains from processors 110 (not shown) a list of all active DLLs that are loaded in more than a threshold number (the threshold number being previously or contemporaneously supplied by human intermediary or dynamically established through use of artificial intelligence) of processes. As will be understood by those conversant in the art, processes and applications typically load DLL's for a number of purposes throughout the execution of the particular process and/or application. Thus, for example, when an application is loaded, the application can load many DLLs that can be written, for instance, by the application vendor/manufacturer, operating system supplier, parties that specialize in providing legitimate third-party add-ins, etc. In general, processes and applications will have some DLLs loaded that are specific to the process and application (e.g., written specifically by the particular application developers) and some DLLs that are common to many applications and processes (e.g., those provided by the operating system to effectuate common system tasks employed by many processes and applications).

Figure 5:
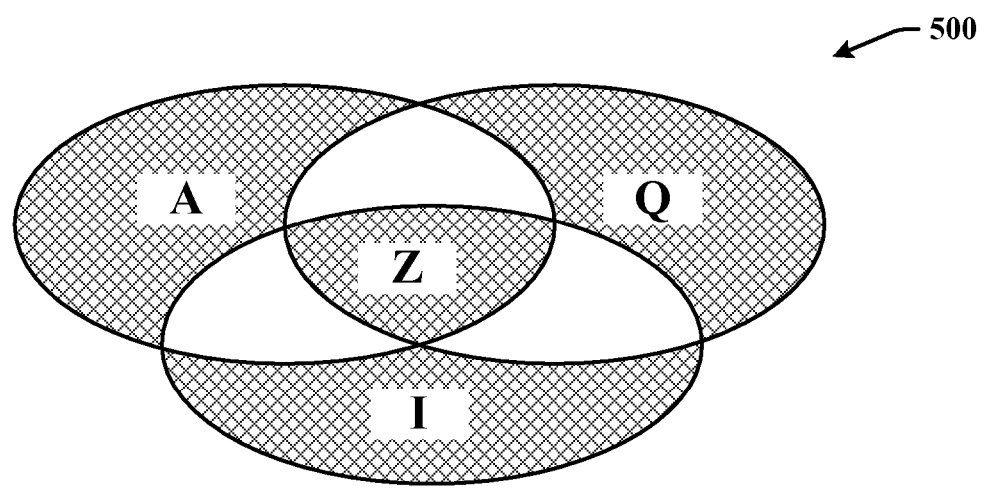
FIG. 5 provides an illustrative view of application and/or memory space assigned to applications and processes in accordance with an aspect of the claimed subject matter.

Accordingly, listing component 310 in one aspect generates lists of all active DLLs that are loaded in more than a threshold number of processes. For example and with reference to FIG. 5, if three applications from different application vendors (e.g., A, I, and Q) are loaded into a particular processors memory and/or application space, listing component 310 can ascertain from the total list of loaded DLLs the set of common DLLs (e.g., Z as illustrated in FIG. 5) that are being utilized by all three executing applications. In other words, listing component 310 identifies the list of common DLLs that reside at the intersection of each of the respective memory spaces allocated to each application. Thus, modules that are unique to application A will not appear in the intersection list, similarly modules specific to applications I and Q also will not appear in the intersection list. Only modules that are common to all three of the illustrative applications will be identified by listing component 310 as being worthy of further review and analysis.

Once listing component 310 has ascertained a list of common modules executing with all active applications and processes, the list is provided to elimination component 320 that in conjunction with one or more white list (e.g. lists of modules provided by application vendors and/or other verifying or certifying bodies the authenticity of which is beyond reproach) eliminates those modules from the list that are known to be good (e.g., modules are eliminated based on the fact that they appear in the one or more white lists). Elimination component 320 can ascertain that a module in the list of common modules corresponds with items supplied on the white list by comparing a cryptographic hash, such as MD5 or SHA-1, of the file with the hash of files known to be good on the white list, for example. Additionally and/or alternatively, other methods which uniquely identify software can also be used. Thus, once elimination component 320 has eliminated known good modules from the list, the modules that remain can be considered potentially unwanted modules and as such candidates for further investigation and/or immediate action based at least in part previously defined sets of commands.

It should be noted that merely because a module has been identified as being of unverified or dubious provenance is not an implication that the module is actionably bad, but rather is an indication that the module's intent and/or purpose has yet to be verified and as such required further consideration.

Accordingly, once elimination component 320 has whittled down the list of common modules to a list that contains modules of dubious provenance, this reduced list can be provided to prioritization component 330. Prioritization component 330 on receipt of the reduced list can provide a ranking (e.g., based on how detrimental the perceived threat from the module might be, based on the number of times a particular module finds its way onto the list, etc.) for use by notification component 230 (See FIG. 2). Prioritization component 330 additionally can accept input and measurements from many other sources of data 340. For example, in addition to DLL injection, measurement of other system resources used by software can be valuable to prioritization component 330. Measurements can include, for instance, registry keys written, read, and/or altered by software, files that are accessed and/or modified, etc. Measurements can be made on PCs of diverse users who happen to have the suspected malware installed and reports can be sent to a centralized prioritization component. Alternatively and/or additionally measurements can be made in a laboratory environment. In addition, prioritization component 330 can attach meta-data, or a report to each suspected malware sample that is processed. For example, the presence of DLL injection can be useful to a human analyst who will examine the sample and possibly compile anti-virus signatures as a response to the detected DLL injection.

FIG. 4 illustrates a system 400 that employs intelligence to facilitate detection of malware. The system 400 can include analysis component 220 and notification component 230, which can be substantially similar to respective components, services, network services, interfaces, and interface components described in previous figures. System 400 further includes an intelligent component 410. The intelligent component 410 can be utilized by both analysis component 220 and notification component 230 to facilitate accurately detecting, identifying and classifying malware and to further provide appropriate notifications to analysts. For example, the intelligent component 410 can infer and classify malware based on previously persisted signatures as being either benign or malignant or inimical to the smooth and secure running of processors 110, etc. Further, intelligence component 410 can employ persisted behaviors associated with previously classified malware to refine and/or vary the definitional norm for execution of various legitimate software (e.g., application and/or operating system software) and based at least in part upon these refinements and/or variations detect abnormalities of operation in such legitimate software.

It is to be understood that the intelligent component 410 can provide for reasoning about or infer states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources. Various classification (explicitly and/or implicitly trained) schemes and/or systems (e.g. support vector machines, neural networks, expert systems, Bayesian belief networks, fuzzy logic, data fusion engines . . . ) can be employed in connection with performing automatic and/or inferred action in connection with the claimed subject matter.

A classifier is a function that maps an input attribute vector, x=(x1, x2, x3, x4, xn), to a confidence that the input belongs to a class, that is, f(x)=confidence(class). Such classification can employ a probabilistic and/or statistical-based analysis (e.g., factoring into the analysis utilities and costs) to infer an action that a user desires to be automatically performed. A support vector machine (SVM) is an example of a classifier that can be employed. The SVM operates by finding a hypersurface in the space of possible inputs, which hypersurface attempts to split the triggering criteria from the non-triggering events. Intuitively, this makes the classification correct for testing data that is near, but not identical to training data. Other directed and undirected model classification approaches include, e.g., naïve Bayes, Bayesian networks, decision trees, neural networks, fuzzy logic models, and probabilistic classification models providing different patterns of independence can be employed. Classification as used herein also is inclusive of statistical regression that is utilized to develop models of priority.

In view of the exemplary systems shown and described supra, methodologies that may be implemented in accordance with the disclosed subject matter will be better appreciated with reference to the flow charts of FIGS. 6-10. While for purposes of simplicity of explanation, the methodologies are shown and described as a series of blocks, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methodologies described hereinafter. Additionally, it should be further appreciated that the methodologies disclosed hereinafter and throughout this specification are capable of being stored on an article of manufacture to facilitate transporting and transferring such methodologies to computers.

The claimed subject matter can be described in the general context of computer-executable instructions, such as program modules, executed by one or more components. Generally, program modules can include routines, programs, objects, data structures, etc. that perform particular tasks or implement particular abstract data types. Typically the functionality of the program modules may be combined and/or distributed as desired in various aspects.

Figure 6:
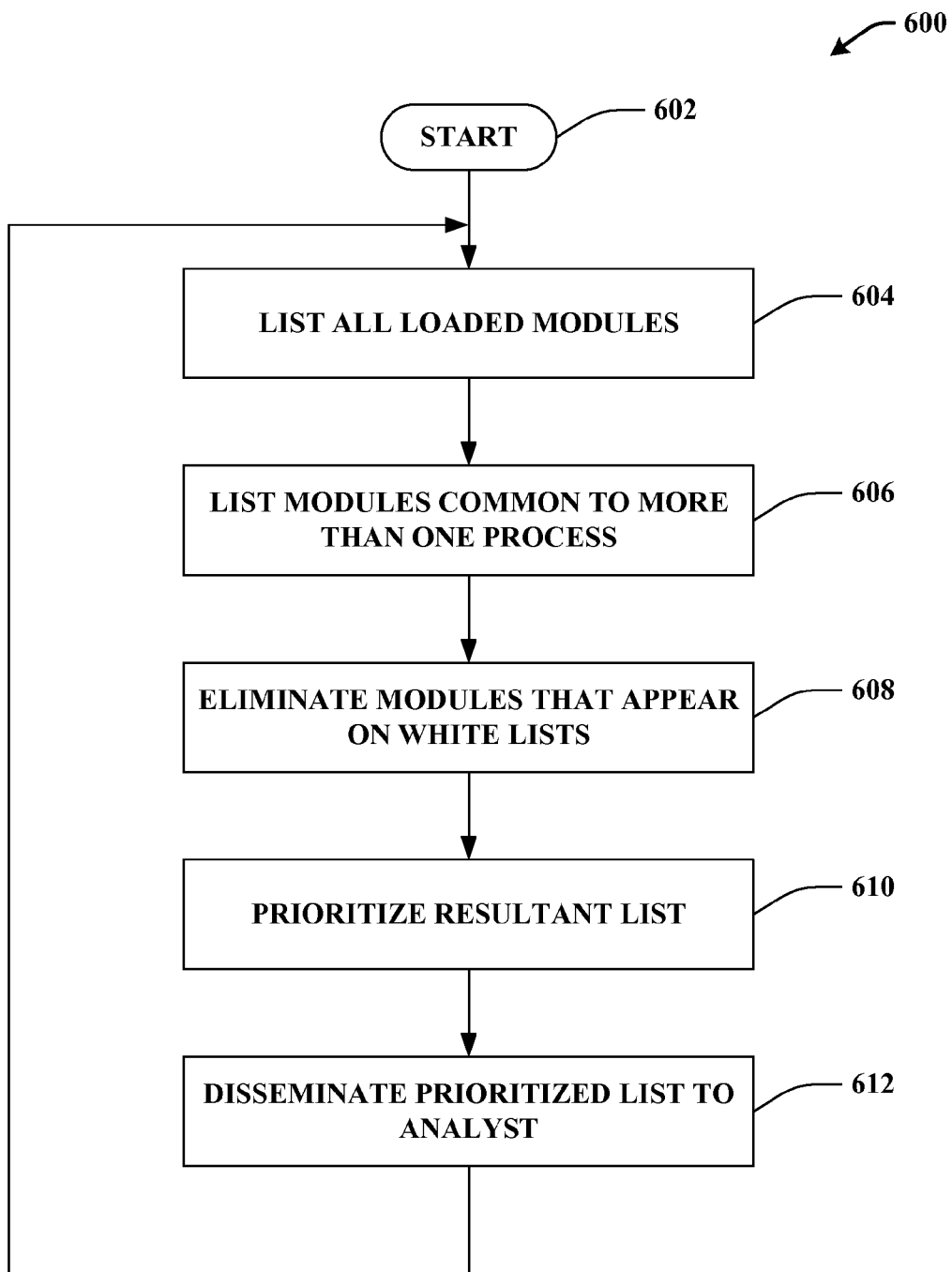
FIG. 6 illustrates a flow diagram of a methodology that effectuates detection of malware executing on a machine in accordance with an aspect of the claimed subject matter.

FIG. 6 illustrates a methodology 600 for detecting malware executing on a machine. Method 600 commences at 602 where various and sundry processor initializations tasks and background activities are performed at which point the method proceeds to 604. At 604 the method lists all modules that have been loaded into a particular processors application and/or memory space. At 606 the method refines the lists by filtering out modules that are specific to a single application or process. At 608 the method eliminates modules that appear on white lists provided by application manufactures and/or reliable independent certification agencies. At 610 the remaining items on the list are prioritized and/or amalgamated with other lists that can have been previously generated to provide a report of modules whose provenance is questionable. At 610 the method progresses to 612 wherein the prioritized, sorted and/or amalgamated list is disseminated to analyst workstations for further investigation by human analysts.

Figure 7:
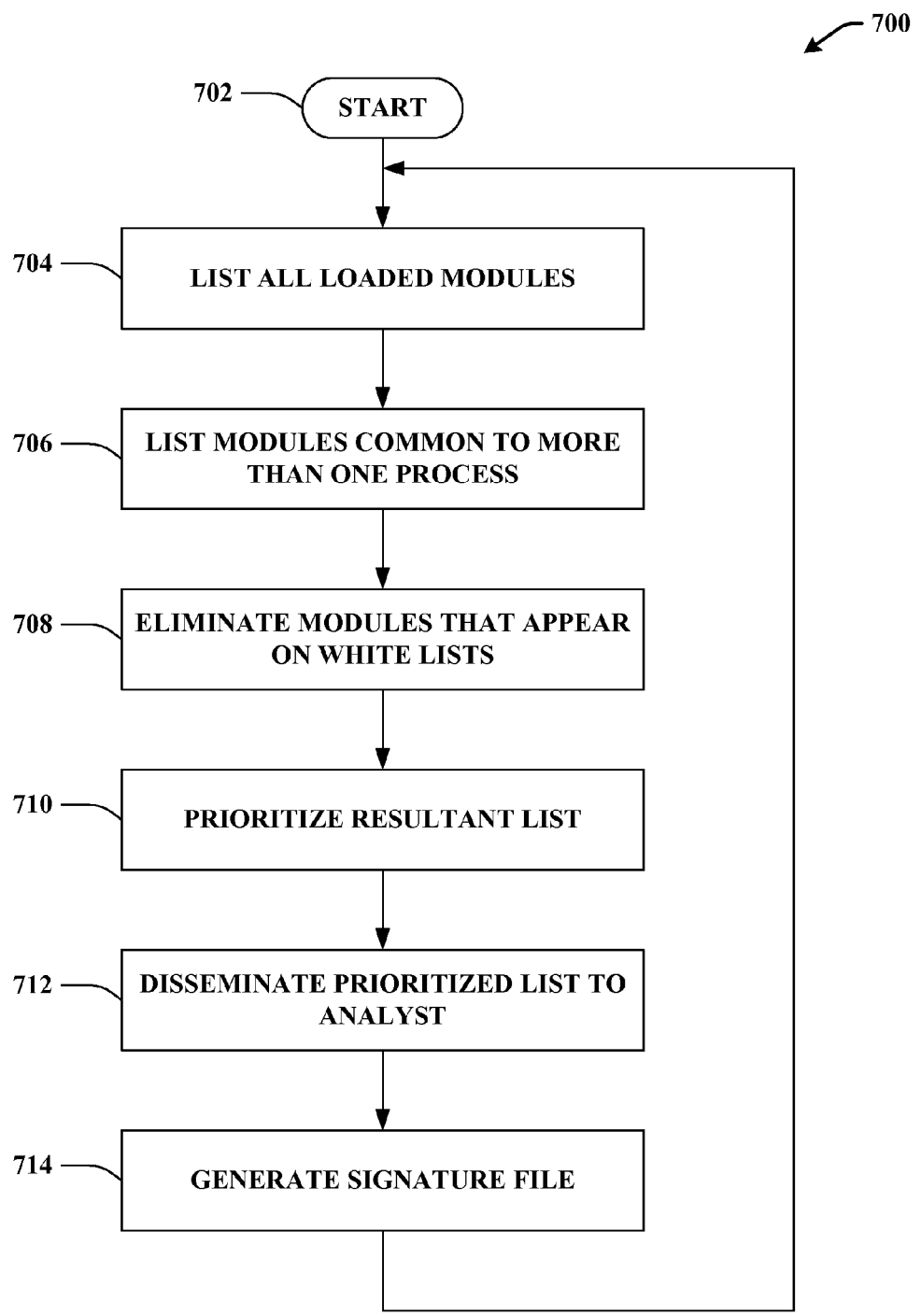
FIG. 7 provides a further methodology for detection of malware executing on a machine in accordance with an aspect of the claimed subject matter.

FIG. 7 provides a further methodology 700 for detection of malware executing on a machine in accordance with an aspect of the claimed subject matter. Method 700 commences at 702 wherein initialization and background activities are performed. At 704 the method produces a list of all modules that have been loaded into the application and/or memory space of a particular processor. At 706 the initial generated list is trimmed by eliminating modules from the list that are specific to a particular application (e.g., those modules that are not employed by more than a threshold number of processes). At 708 the method further trims the list by eliminating modules that are included in white lists (or verification lists) obtained from software suppliers, application software providers, trusted third party certification agencies, and the like. At 710 those items that remain on the trimmed list are categorized, prioritized and/or amalgamated with other lists that can have been previously generated to provide a report of modules whose provenance is questionable. The questionable provenance of modules can be based at least in part on software code that initiated the module to load (e.g., known applications, operating system components, websites whose reputations are known, unknown, or known to be bad, etc.) At 710 the method progresses to 712 wherein the prioritized, categorized and/or amalgamated list is disseminated to analyst workstations for further investigation by human analysts. At 714 the method can, with input from an artificial intelligence engine and/or human analysts, dynamically and automatically generate a signature file (e.g. for use in detection of subsequent malware and/or mutations thereof) for use in countering instances of malware that are surreptitiously implemented on a particular machine and/or processor.

Figure 8:
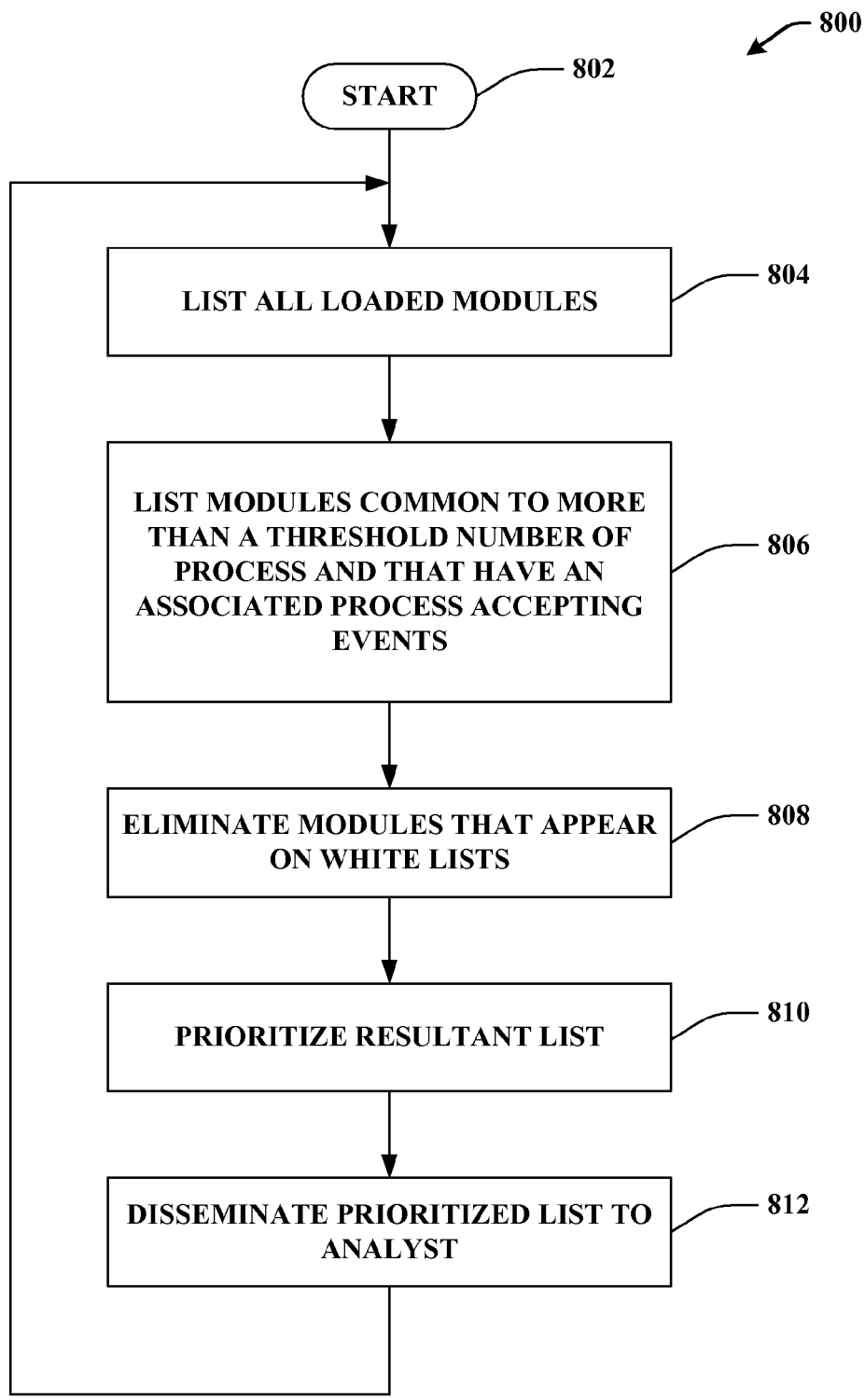
FIG. 8 provides a further methodology for detection of malware executing on a machine in accordance with a further aspect of the claimed subject matter.

FIG. 8 provides a further methodology 800 for detection of malware executing on a machine in accordance with a further aspect of the claimed subject matter. At 802 multiple background initialization and activities are performed whereupon method 800 proceeds to 804 where a list of all modules resident in application memory space is generated. At 806 the initial list generated at 804 is truncated by focusing on modules that are common to more than a threshold number (e.g., the threshold number dynamically and automatically determined in conjunction with an artificial intelligence attribute and/or supplied by human intermediaries) of processes and where the module has associated a process that has accepted at least one event in the immediate past. For example, if one were looking to identify with specificity key-loggers, uncovering modules that have accepted keystrokes in the immediate past is definitely sensible and efficacious to the detection and subsequent elimination of such instances of malware. At 808 the method identifies, in conjunction with authentication lists obtained and/or supplied from one or more external sources (e.g., application developer, pre-analysis of source by independent third party authenticators, periodic updates from authenticated application source vendor, etc.) and/or dynamically generated by an artificial intelligence component, modules that are consonant with the obtained and/or supplied authentication lists. At 810 modules that still remain (e.g., modules requiring further scrutiny) are prioritized. Prioritization can take one or more of the following forms. Identified modules can be associated with an ordered list (e.g., the order established based at least in part on the number of times that an instance of the module has been detected within a fixed and/or arbitrary period of time, the number of times that an instance of the module has been aggregated from multiple machines, etc.), color coded list (e.g., red, amber, yellow, blue, green, and/or variants thereof), tagged with a criticality flag (e.g., critical, severe, substantial, moderate, low, etc.), and the like. The prioritized resultant list can, at 812, be subject to dissemination to analyst workstations for further examination and possible resolution by a human intermediary and/or an artificial intelligence component.

Figure 9:
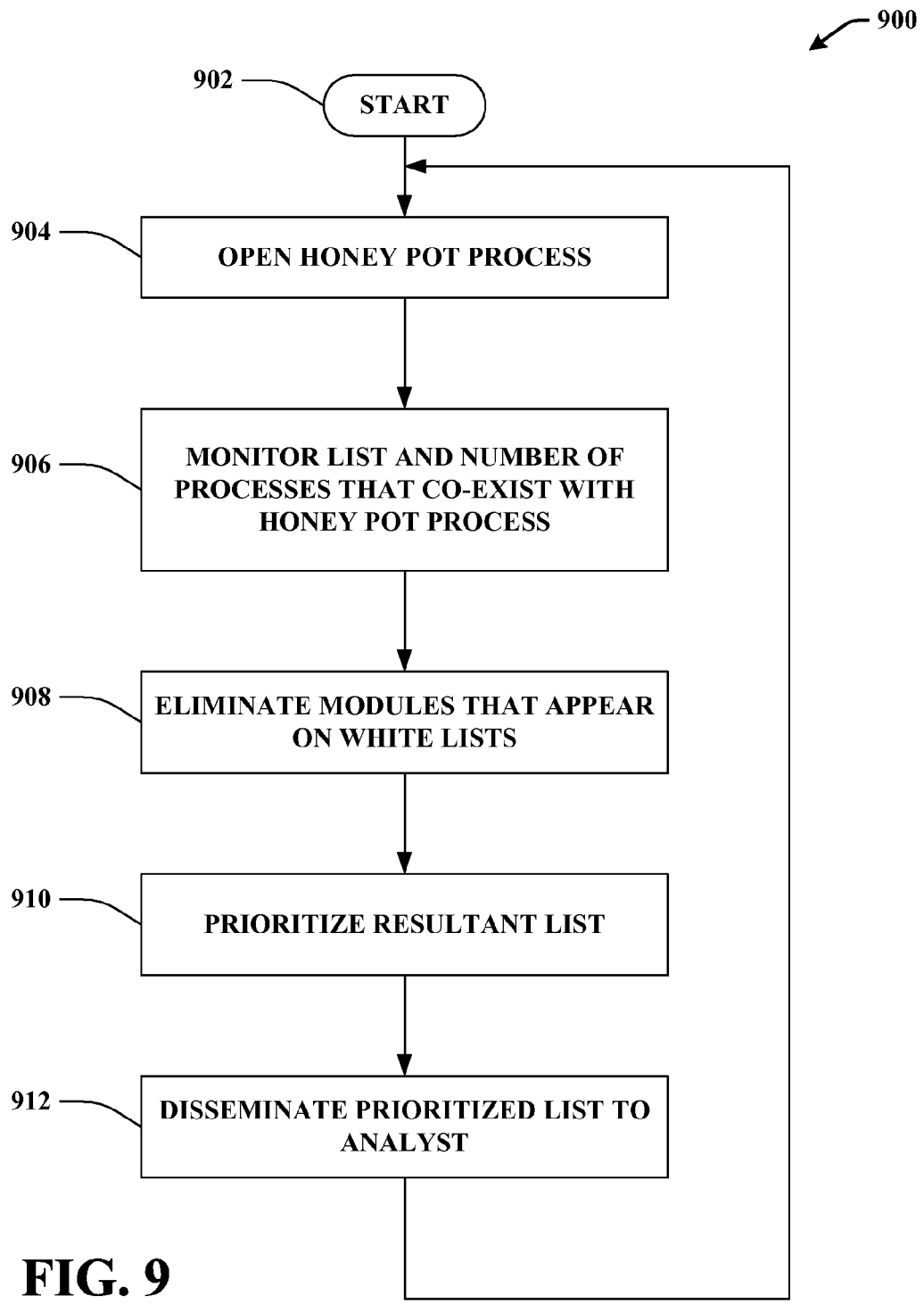
FIG. 9 provides yet a further methodology for detection of malware executing on a machine in accordance with an aspect of the claimed subject matter.

FIG. 9 provides yet a further methodology 900 for detection of malware executing on a machine in accordance with an aspect of the claimed subject matter. At 902 initialization processes take place after which method 900 proceeds to 904. At 904 a "honey pot" process (e.g. a process that mimics a process to which malware might attach) is initiated. For example, if it is determined that malware might wish to create a remote process associated with Internet Explorer, a "honey pot" process can be created and instantiated as an instance of Internet Explorer, wherein the "honey pot" process mimics some of the functionality associated with Internet Explorer. It should be noted that the "honey pot" process merely mimics the functionality of Internet Explorer but does not necessarily provide the full suite of functionality typically associated with Internet Explorer. Thus, being a "honey pot" process an analyst initiating the "honey pot" process is aware of the limited number of modules associated with the "honey pot" process (e.g., the analyst will be aware that the total number of modules that should be loaded equals 10). Consequently, when the "honey pot" process is loaded and investigation reveals that 11 modules were loaded, the analyst can deduce that the $11^{th}$ module might be associated with malware and as such can be cause for concern since the "honey pot" process itself does not have, for example, the full set extensibility and plug-in modules loaded. Accordingly, at 906 the method monitors the list and number of processes that co-exist with the "honey pot" process. At 908 modules and/or processes that appear in authentication (e.g., white lists) are removed from the list of modules being monitored. At 910 the resultant list of remaining modules and/or processes is prioritized in manners described supra. At 912 the method commences to distribute the prioritized list to analysts for further examination and possible resolution by a human intermediary and/or an artificial intelligence component.

Figure 10:
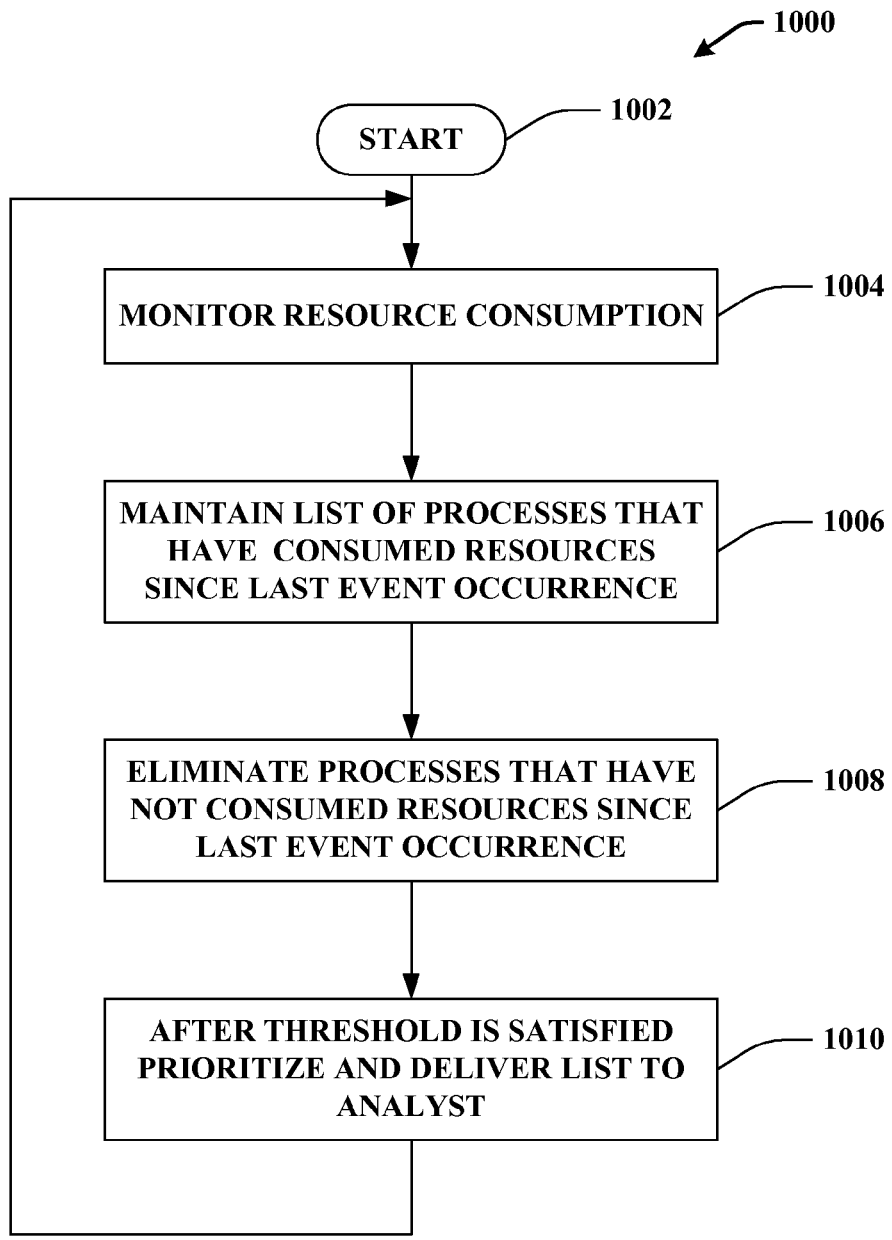
FIG. 10 depicts a methodology for detection of malware active on a machine in accordance with a further aspect of the subject matter as claimed.

FIG. 10 depicts a methodology 1000 for detection of malware active on a machine in accordance with a further aspect of the subject matter as claimed. As it is recognized that occasionally malware does not employ DLL injection methodologies to effectuate malware introduction to systems and machines. Under this scenario, malware authors execute malware code openly in the task list by innocuously naming the executing malware code (e.g., plugin_helper.exe, etc.) to masquerade the true nature of the malware code and to avoid suspicion. Accordingly, for example, an event logger (e.g., key-logger) can surreptitiously record events as these events occur. Thus, every time an event occurs code is generated and executed (e.g., code could be implemented to add the occurring event to a buffer for future use, etc.). However, because recording and storing events utilizes resources, albeit minuscule, it can be difficult to entirely conceal this aspect of malware. Moreover, it is exceedingly atypical that a process will utilize resources for long and continuous durations of time (e.g., it is unusual that a process with have activity associated with it after each and every instance of an event). Therefore, by utilizing these observations methodology 1000 can detect malware active on a machine by performing background and initialization processes at 1002, and thereafter at 1004 and 1006 periodically and/or continuously monitoring resource consumption of a processor and maintaining a list of processes that continually consume resources over a discrete period of time (e.g., resources are consumed for every successive event that occurs regardless of the application in focus). At 1008 processes that do not consume resources between a first threshold number of events (e.g., one, two, three, four, etc.) can be eliminated. At 1010 processes that have not been removed from the list after a second threshold (or a set point) are processes that have serially consumed resources and thus need further investigation. Thus, at 1010 the list is prioritized and delivered to an analyst workstation for further examination and possible resolution by a human intermediary and/or an artificial intelligence component.

The claimed subject matter can be implemented via object oriented programming techniques. For example, each component of the system can be an object in a software routine or a component within an object. Object oriented programming shifts the emphasis of software development away from function decomposition and towards the recognition of units of software called "objects" which encapsulate both data and functions. Object Oriented Programming (OOP) objects are software entities comprising data structures and operations on data. Together, these elements enable objects to model virtually any real-world entity in terms of its characteristics, represented by its data elements, and its behavior represented by its data manipulation functions. In this way, objects can model concrete things like people and computers, and they can model abstract concepts like numbers or geometrical concepts.

The benefit of object technology arises out of three basic principles: encapsulation, polymorphism and inheritance. Objects hide or encapsulate the internal structure of their data and the algorithms by which their functions work. Instead of exposing these implementation details, objects present interfaces that represent their abstractions cleanly with no extraneous information. Polymorphism takes encapsulation one-step further—the idea being many shapes, one interface. A software component can make a request of another component without knowing exactly what that component is. The component that receives the request interprets it and figures out according to its variables and data how to execute the request. The third principle is inheritance, which allows developers to reuse pre-existing design and code. This capability allows developers to avoid creating software from scratch. Rather, through inheritance, developers derive subclasses that inherit behaviors that the developer then customizes to meet particular needs.

In particular, an object includes, and is characterized by, a set of data (e.g., attributes) and a set of operations (e.g. methods), that can operate on the data. Generally, an object's data is ideally changed only through the operation of the object's methods. Methods in an object are invoked by passing a message to the object (e.g., message passing). The message specifies a method name and an argument list. When the object receives the message, code associated with the named method is executed with the formal parameters of the method bound to the corresponding values in the argument list. Methods and message passing in OOP are analogous to procedures and procedure calls in procedure-oriented software environments.

However, while procedures operate to modify and return passed parameters, methods operate to modify the internal state of the associated objects (by modifying the data contained therein). The combination of data and methods in objects is called encapsulation. Encapsulation provides for the state of an object to only be changed by well-defined methods associated with the object. When the behavior of an object is confined to such well-defined locations and interfaces, changes (e.g., code modifications) in the object will have minimal impact on the other objects and elements in the system.

Each object is an instance of some class. A class includes a set of data attributes plus a set of allowable operations (e.g., methods) on the data attributes. As mentioned above, OOP supports inheritance—a class (called a subclass) may be derived from another class (called a base class, parent class, etc.), where the subclass inherits the data attributes and methods of the base class. The subclass may specialize the base class by adding code which overrides the data and/or methods of the base class, or which adds new data attributes and methods. Thus, inheritance represents a mechanism by which abstractions are made increasingly concrete as subclasses are created for greater levels of specialization.

As used in this application, the terms "component" and "system" are intended to refer to a computer-related entity, either hardware, a combination of hardware and software, software, or software in execution. For example, a component can be, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers.

Artificial intelligence based systems (e.g., explicitly and/or implicitly trained classifiers) can be employed in connection with performing inference and/or probabilistic determinations and/or statistical-based determinations as in accordance with one or more aspects of the claimed subject matter as described hereinafter. As used herein, the term "inference," "infer" or variations in form thereof refers generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources. Various classification schemes and/or systems (e.g., support vector machines, neural networks, expert systems, Bayesian belief networks, fuzzy logic, data fusion engines . . . ) can be employed in connection with performing automatic and/or inferred action in connection with the claimed subject matter.

Furthermore, all or portions of the claimed subject matter may be implemented as a system, method, apparatus, or article of manufacture using standard programming and/or engineering techniques to produce software, firmware, hardware or any combination thereof to control a computer to implement the disclosed subject matter. The term "article of manufacture" as used herein is intended to encompass a computer program accessible from any computer-readable device or media. For example, computer readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick, key drive . . . ). Additionally it should be appreciated that a carrier wave can be employed to carry computer-readable electronic data such as those used in transmitting and receiving electronic mail or in accessing a network such as the Internet or a local area network (LAN). Of course, those skilled in the art will recognize many modifications may be made to this configuration without departing from the scope or spirit of the claimed subject matter.

Some portions of the detailed description have been presented in terms of algorithms and/or symbolic representations of operations on data bits within a computer memory. These algorithmic descriptions and/or representations are the means employed by those cognizant in the art to most effectively convey the substance of their work to others equally skilled. An algorithm is here, generally, conceived to be a self-consistent sequence of acts leading to a desired result. The acts are those requiring physical manipulations of physical quantities. Typically, though not necessarily, these quantities take the form of electrical and/or magnetic signals capable of being stored, transferred, combined, compared, and/or otherwise manipulated.

It has proven convenient at times, principally for reasons of common usage, to refer to these signals as bits, values, elements, symbols, characters, terms, numbers, or the like. It should be borne in mind, however, that all of these and similar terms are to be associated with the appropriate physical quantities and are merely convenient labels applied to these quantities. Unless specifically stated otherwise as apparent from the foregoing discussion, it is appreciated that throughout the disclosed subject matter, discussions utilizing terms such as processing, computing, calculating, determining, and/or displaying, and the like, refer to the action and processes of computer systems, and/or similar consumer and/or industrial electronic devices and/or machines, that manipulate and/or transform data represented as physical (electrical and/or electronic) quantities within the computer's and/or machine's registers and memories into other data similarly represented as physical quantities within the machine and/or computer system memories or registers or other such information storage, transmission and/or display devices.

Figure 11:
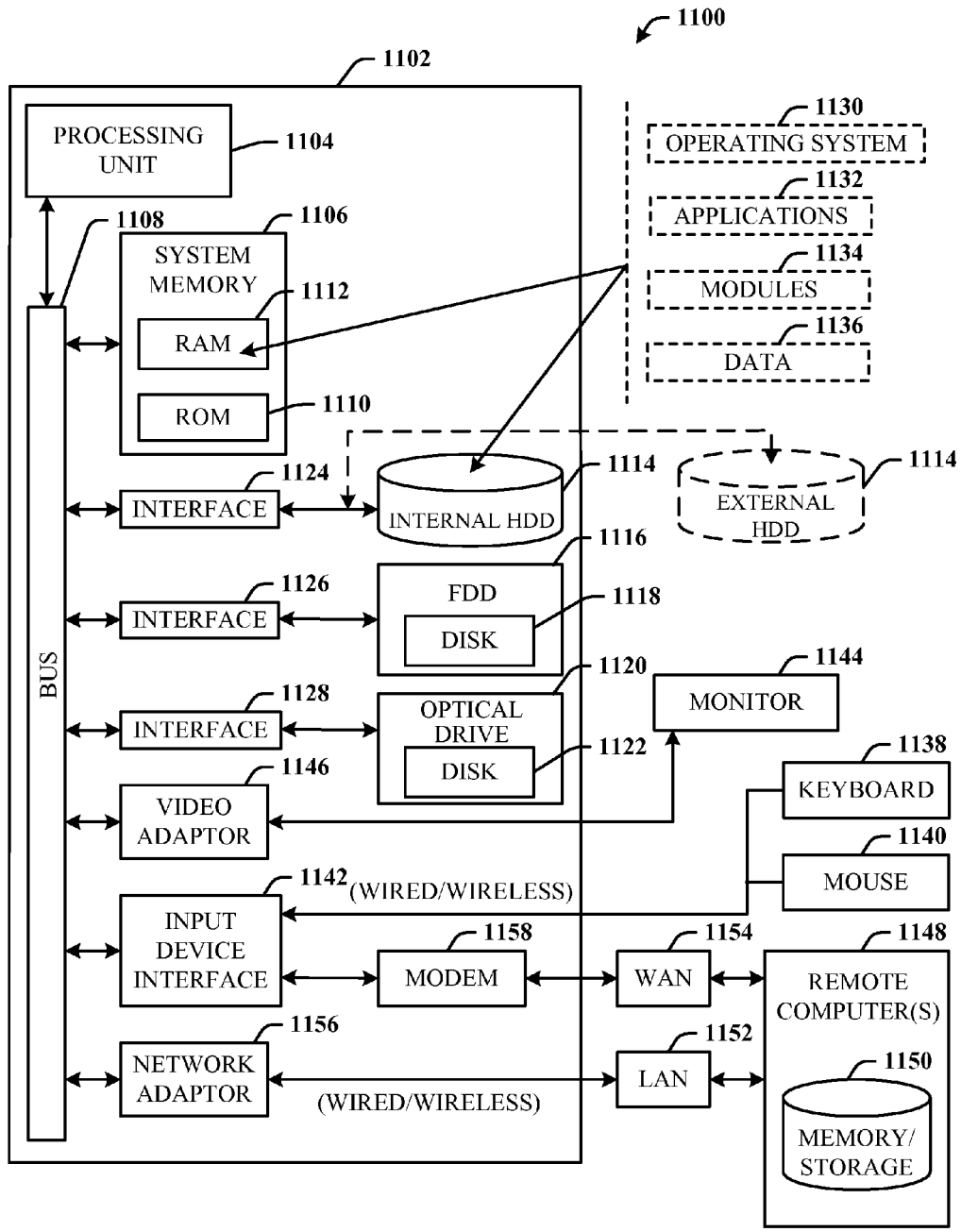
FIG. 11 illustrates a block diagram of a computer operable to execute the spyware detection architecture.

Referring now to FIG. 11, there is illustrated a block diagram of a computer operable to execute the disclosed malware detection system. In order to provide additional context for various aspects thereof, FIG. 11 and the following discussion are intended to provide a brief, general description of a suitable computing environment 1100 in which the various aspects of the claimed subject matter can be implemented. While the description above is in the general context of computer-executable instructions that may run on one or more computers, those skilled in the art will recognize that the subject matter as claimed also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated aspects of the claimed subject matter may also be practiced in distributed computing environments where certain tasks are performed by remote processing devices that are linked through a communications network. In a distributed computing environment, program modules can be located in both local and remote memory storage devices.

A computer typically includes a variety of computer-readable media. Computer-readable media can be any available media that can be accessed by the computer and includes both volatile and non-volatile media, removable and non-removable media. By way of example, and not limitation, computer-readable media can comprise computer storage media and communication media. Computer storage media includes both volatile and non-volatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital video disk (DVD) or other optical disk storage, magnetic cassettes, magnetic tape, magnetic disk storage or other magnetic storage devices, or any other medium which can be used to store the desired information and which can be accessed by the computer.

With reference again to FIG. 11, the exemplary environment 1100 for implementing various aspects includes a computer 1102, the computer 1102 including a processing unit 1104, a system memory 1106 and a system bus 1108. The system bus 1108 couples system components including, but not limited to, the system memory 1106 to the processing unit 1104. The processing unit 1104 can be any of various commercially available processors. Dual microprocessors and other multi-processor architectures may also be employed as the processing unit 1104.

The system bus 1108 can be any of several types of bus structure that may further interconnect to a memory bus (with or without a memory controller), a peripheral bus, and a local bus using any of a variety of commercially available bus architectures. The system memory 1106 includes read-only memory (ROM) 1110 and random access memory (RAM) 1112. A basic input/output system (BIOS) is stored in a non-volatile memory 1110 such as ROM, EPROM, EEPROM, which BIOS contains the basic routines that help to transfer information between elements within the computer 1102, such as during start-up. The RAM 1112 can also include a high-speed RAM such as static RAM for caching data.

The computer 1102 further includes an internal hard disk drive (HDD) 1114 (e.g., EIDE, SATA), which internal hard disk drive 1114 may also be configured for external use in a suitable chassis (not shown), a magnetic floppy disk drive (FDD) 1116, (e.g., to read from or write to a removable diskette 1118) and an optical disk drive 1120, (e.g., reading a CD-ROM disk 1122 or, to read from or write to other high capacity optical media such as the DVD). The hard disk drive 1114, magnetic disk drive 1116 and optical disk drive 1120 can be connected to the system bus 1108 by a hard disk drive interface 1124, a magnetic disk drive interface 1126 and an optical drive interface 1128, respectively. The interface 1124 for external drive implementations includes at least one or both of Universal Serial Bus (USB) and IEEE 1394 interface technologies. Other external drive connection technologies are within contemplation of the claimed subject matter.

The drives and their associated computer-readable media provide nonvolatile storage of data, data structures, computer-executable instructions, and so forth. For the computer 1102, the drives and media accommodate the storage of any data in a suitable digital format. Although the description of computer-readable media above refers to a HDD, a removable magnetic diskette, and a removable optical media such as a CD or DVD, it should be appreciated by those skilled in the art that other types of media which are readable by a computer, such as zip drives, magnetic cassettes, flash memory cards, cartridges, and the like, may also be used in the exemplary operating environment, and further, that any such media may contain computer-executable instructions for performing the methods of the disclosed and claimed subject matter.

A number of program modules can be stored in the drives and RAM 1112, including an operating system 1130, one or more application programs 1132, other program modules 1134 and program data 1136. All or portions of the operating system, applications, modules, and/or data can also be cached in the RAM 1112. It is to be appreciated that the claimed subject matter can be implemented with various commercially available operating systems or combinations of operating systems.

A user can enter commands and information into the computer 1102 through one or more wired/wireless input devices, e.g. a keyboard 1138 and a pointing device, such as a mouse 1140. Other input devices (not shown) may include a microphone, an IR remote control, a joystick, a game pad, a stylus pen, touch screen, or the like. These and other input devices are often connected to the processing unit 1104 through an input device interface 1142 that is coupled to the system bus 1108, but can be connected by other interfaces, such as a parallel port, an IEEE 1394 serial port, a game port, a USB port, an IR interface, etc.

A monitor 1144 or other type of display device is also connected to the system bus 1108 via an interface, such as a video adapter 1146. In addition to the monitor 1144, a computer typically includes other peripheral output devices (not shown), such as speakers, printers, etc.

The computer 1102 may operate in a networked environment using logical connections via wired and/or wireless communications to one or more remote computers, such as a remote computer(s) 1148. The remote computer(s) 1148 can be a workstation, a server computer, a router, a personal computer, portable computer, microprocessor-based entertainment appliance, a peer device or other common network node, and typically includes many or all of the elements described relative to the computer 1102, although, for purposes of brevity, only a memory/storage device 1150 is illustrated. The logical connections depicted include wired/wireless connectivity to a local area network (LAN) 1152 and/or larger networks, e.g., a wide area network (WAN) 1154. Such LAN and WAN networking environments are commonplace in offices and companies, and facilitate enterprise-wide computer networks, such as intranets, all of which may connect to a global communications network, e.g., the Internet.

When used in a LAN networking environment, the computer 1102 is connected to the local network 1152 through a wired and/or wireless communication network interface or adapter 1156. The adaptor 1156 may facilitate wired or wireless communication to the LAN 1152, which may also include a wireless access point disposed thereon for communicating with the wireless adaptor 1156.

When used in a WAN networking environment, the computer 1102 can include a modem 1158, or is connected to a communications server on the WAN 1154, or has other means for establishing communications over the WAN 1154, such as by way of the Internet. The modem 1158, which can be internal or external and a wired or wireless device, is connected to the system bus 1108 via the serial port interface 1142. In a networked environment, program modules depicted relative to the computer 1102, or portions thereof, can be stored in the remote memory/storage device 1150. It will be appreciated that the network connections shown are exemplary and other means of establishing a communications link between the computers can be used.

The computer 1102 is operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This includes at least Wi-Fi and Bluetooth™ wireless technologies. Thus, the communication can be a predefined structure as with a conventional network or simply an ad hoc communication between at least two devices.

Wi-Fi, or Wireless Fidelity, allows connection to the Internet from a couch at home, a bed in a hotel room, or a conference room at work, without wires. Wi-Fi is a wireless technology similar to that used in a cell phone that enables such devices, e.g., computers, to send and receive data indoors and out; anywhere within the range of a base station. Wi-Fi networks can for example use radio technologies called IEEE 802.11x (a, b, g, etc.) to provide secure, reliable, fast wireless connectivity. Other radio technologies that can also be employed include Bluetooth, RF, and the like. A Wi-Fi network can be used to connect computers to each other, to the Internet, and to wired networks (which use IEEE 802.3 or Ethernet).

Wi-Fi networks can operate in the unlicensed 2.4 and 5 GHz radio bands. IEEE 802.11 applies to generally to wireless LANs and provides 1 or 2 Mbps transmission in the 2.4 GHz band using either frequency hopping spread spectrum (FHSS) or direct sequence spread spectrum (DSSS). IEEE 802.11a is an extension to IEEE 802.11 that applies to wireless LANs and provides up to 54 Mbps in the 5 GHz band. IEEE 802.11a uses an orthogonal frequency division multiplexing (OFDM) encoding scheme rather than FHSS or DSSS. IEEE 802.11b (also referred to as 802.11 High Rate DSSS or Wi-Fi) is an extension to 802.11 that applies to wireless LANs and provides 11 Mbps transmission (with a fallback to 5.5, 2 and 1 Mbps) in the 2.4 GHz band. IEEE 802.11g applies to wireless LANs and provides 20+ Mbps in the 2.4 GHz band. Products can contain more than one band (e.g., dual band), so the networks can provide real-world performance similar to the basic 10BaseT or 100BaseT wired Ethernet networks used in many offices.

Figure 12:
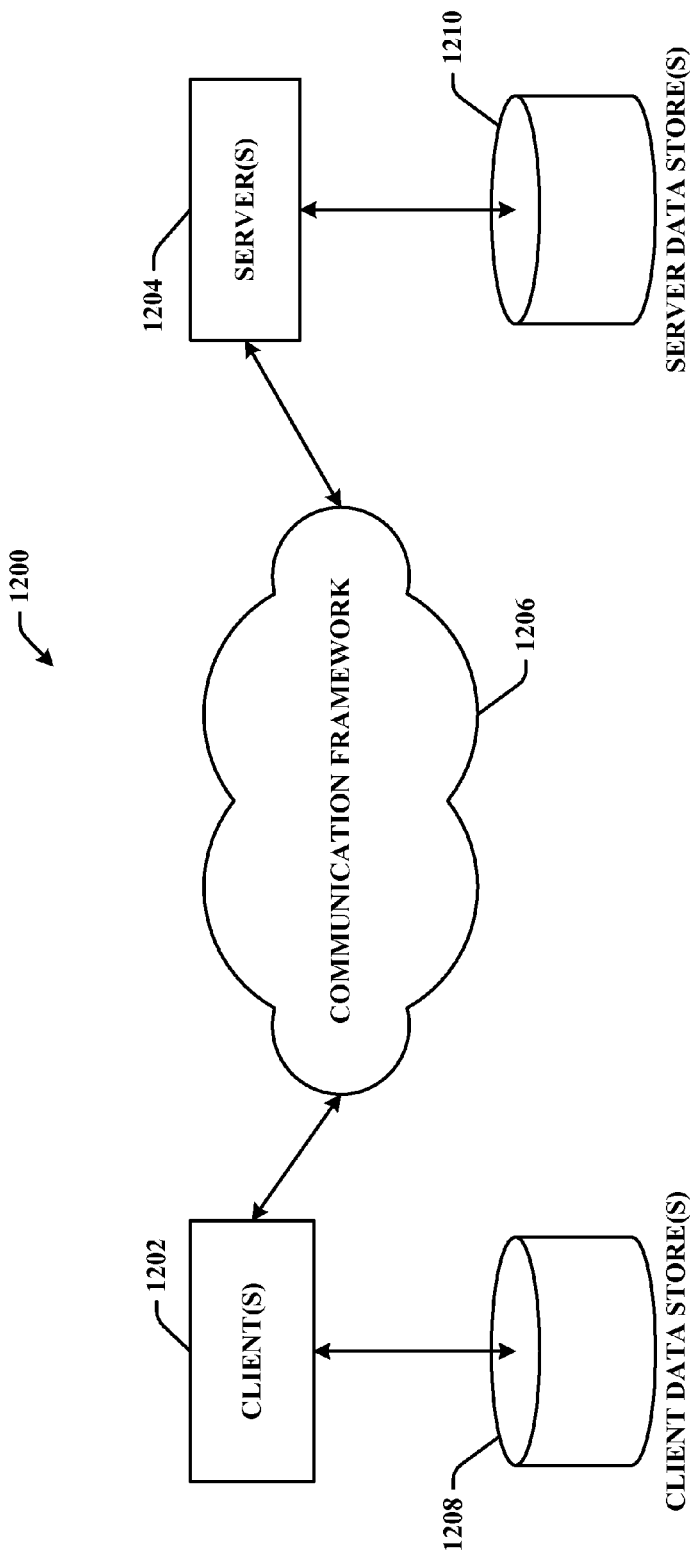
FIG. 12 illustrates a schematic block diagram of an exemplary computing environment for processing the spyware detection architecture in accordance with another aspect.

Referring now to FIG. 12, there is illustrated a schematic block diagram of an exemplary computing environment 1200 for processing the malware detection architecture in accordance with another aspect. The system 1200 includes one or more client(s) 1202. The client(s) 1202 can be hardware and/or software (e.g., threads, processes, computing devices). The client(s) 1202 can house cookie(s) and/or associated contextual information by employing the claimed subject matter, for example.

The system 1200 also includes one or more server(s) 1204. The server(s) 1204 can also be hardware and/or software (e.g., threads, processes, computing devices). The servers 1204 can house threads to perform transformations by employing the claimed subject matter, for example. One possible communication between a client 1202 and a server 1204 can be in the form of a data packet adapted to be transmitted between two or more computer processes. The data packet may include a cookie and/or associated contextual information, for example. The system 1200 includes a communication framework 1206 (e.g., a global communication network such as the Internet) that can be employed to facilitate communications between the client(s) 1202 and the server(s) 1204.

Communications can be facilitated via a wired (including optical fiber) and/or wireless technology. The client(s) 1202 are operatively connected to one or more client data store(s) 1208 that can be employed to store information local to the client(s) 1202 (e.g., cookie(s) and/or associated contextual information). Similarly, the server(s) 1204 are operatively connected to one or more server data store(s) 1210 that can be employed to store information local to the servers 1204.

What has been described above includes examples of the disclosed and claimed subject matter. It is, of course, not possible to describe every conceivable combination of components and/or methodologies, but one of ordinary skill in the art may recognize that many further combinations and permutations are possible. Accordingly, the claimed subject matter is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A system implemented on a machine that exposes spyware installed on the machine, the system comprising:
a processor; and
a memory for storing a detection component that when executed by the processor cause the processor to:
generate a list of loaded modules,
identify from the list of loaded modules a set of modules, each module in the set of modules being loaded in more than a threshold number of processes, the threshold number of processes being supplied by an operator or determined by an artificial intelligence component;
obtain an authentication list from one or more external sources, the authentication list including at least one of verified signature files generated by a supplier of application software or signature files generated by third parties trusted by a user;
eliminate from the set of modules those modules included in the authentication list;
generate a resultant list of modules that are not included in the authentication list;
generate a ranked resultant list by prioritizing a list of suspected spyware samples contained within the resultant list of modules partially based on one or more measurements received from external sources, the one or more measurements including at least one of a number of times each suspected spyware sample is found on the resultant list, a number of times each suspected spyware sample is aggregated from multiple machines, or a criticality flag associated with one or more particular suspected spyware samples; and
disseminate the ranked resultant list to an analyst workstation.

2. The system of claim 1, wherein the threshold number of processes is an integer greater than or equal to one.

3. The system of claim 1, wherein the authentication list is generated by a third party authenticated application software developer.

4. The system of claim 1, wherein the detection component further includes an intelligence component that generates corrective signatures based on at least the resultant list and previously persisted resultant lists.

5. The system of claim 1, wherein the ranked resultant list includes modules associated with a color code that denotes a degree of severity ascertained by the detection component.

6. The system of claim 1, wherein the ranked resultant list includes modules associated with severity tags determined by the detection component, tags based on reputation, or tags related to ratings other than a level of risk.

7. The system of claim 1, wherein at least one module of the set of modules is associated with a process that accepts event information.

8. The system of claim 7, wherein the event information includes a key depression event, an N-mouse click event, where N is an integer greater than zero, a right-mouse click event, or a left-mouse click event.

9. A machine implemented method that reveals malware surreptitiously secreted on the machine, comprising:
instantiating a process on the machine that mimics a basic replica of an application;
monitoring a list of processes that commence when the basic replica is initiated;
accounting for processes that use resources in excess of a first threshold, the first threshold being supplied by an operator or determined by an artificial intelligence component;
eliminating processes that correspond with signature files associated with an authentication list to create an ordered resultant list of modules, the authentication list including at least one of verified signature files generated by a supplier of application software or signature files generated by third parties trusted by a user;
generating a ranked list of suspected spyware by prioritizing a plurality of suspected spyware samples included in the ordered resultant list at least partially based on at least one of a number of times each suspected spyware sample of the plurality of suspected spyware samples is found on the ordered resultant list; a number of times each suspected spyware sample of the plurality of suspected spyware samples is aggregated from multiple machines, or a criticality flag associated with one or more particular suspected spyware samples of the plurality of suspected spyware samples; and
disseminating the ranked list of suspected spyware to an analyst workstation.

10. The method of claim 9, wherein the monitoring includes contrasting a known number of processes associated with the basic replica with an actual number of processes that occur when the basic replica is initiated.

11. The method of claim 10, wherein a difference between the known number of processes and the actual number of processes is indicative of parasitic processes.

12. The method of claim 9, wherein the first threshold is greater than or equal to one.

13. The method of claim 9, wherein the monitoring further includes keeping track of a number of event occurrences and curtailing the monitoring when the number of event occurrences exceeds a second threshold.

14. The method of claim 13, wherein an event includes at least one of a key depression, one or more mouse-clicks, a window opening, a window closing, a window positioning, a window scrolling, or a combination thereof.

15. The method of claim 13, wherein the second threshold is greater than or equal to one.

16. The method of claim 9, wherein the ranked list of suspected spyware is color coded based on a perceived severity.

17. The method of claim 9, further comprising utilizing artificial intelligence to generate one or more curative signature files.

18. A computer storage device comprising a plurality of executable instructions stored on the storage device and configured to program a computing device to perform operations including:
maintaining a list of processes accessible to a plurality of machines;
monitoring resource consumption by individual processes of the listed processes at individual ones of the plurality of machines;
eliminating from the list of processes a first number of the individual processes that have not consumed resources over a first threshold period of time;
generating a resultant list, the resultant list including a second number of the individual process that have consumed resources over a second threshold period of time, the consumption of resources over the second threshold period of time being indicative of malicious activity;
generating a ranked resultant list by prioritizing one or more suspected spyware samples on the resultant list at least partially based on at least one of a number of times each suspected spyware sample is found on the resultant list, a number of times each suspected spyware sample is aggregated from multiple machines, or a criticality flag associated with one or more particular suspected spyware samples; and disseminating the ranked resultant list to a computer.

* * * * *